Feb. 28, 1928.  
C. W. OWSTON  
1,660,576  
METHOD OF AND APPARATUS FOR SOLDERING  
Filed March 30, 1925   5 Sheets-Sheet 1
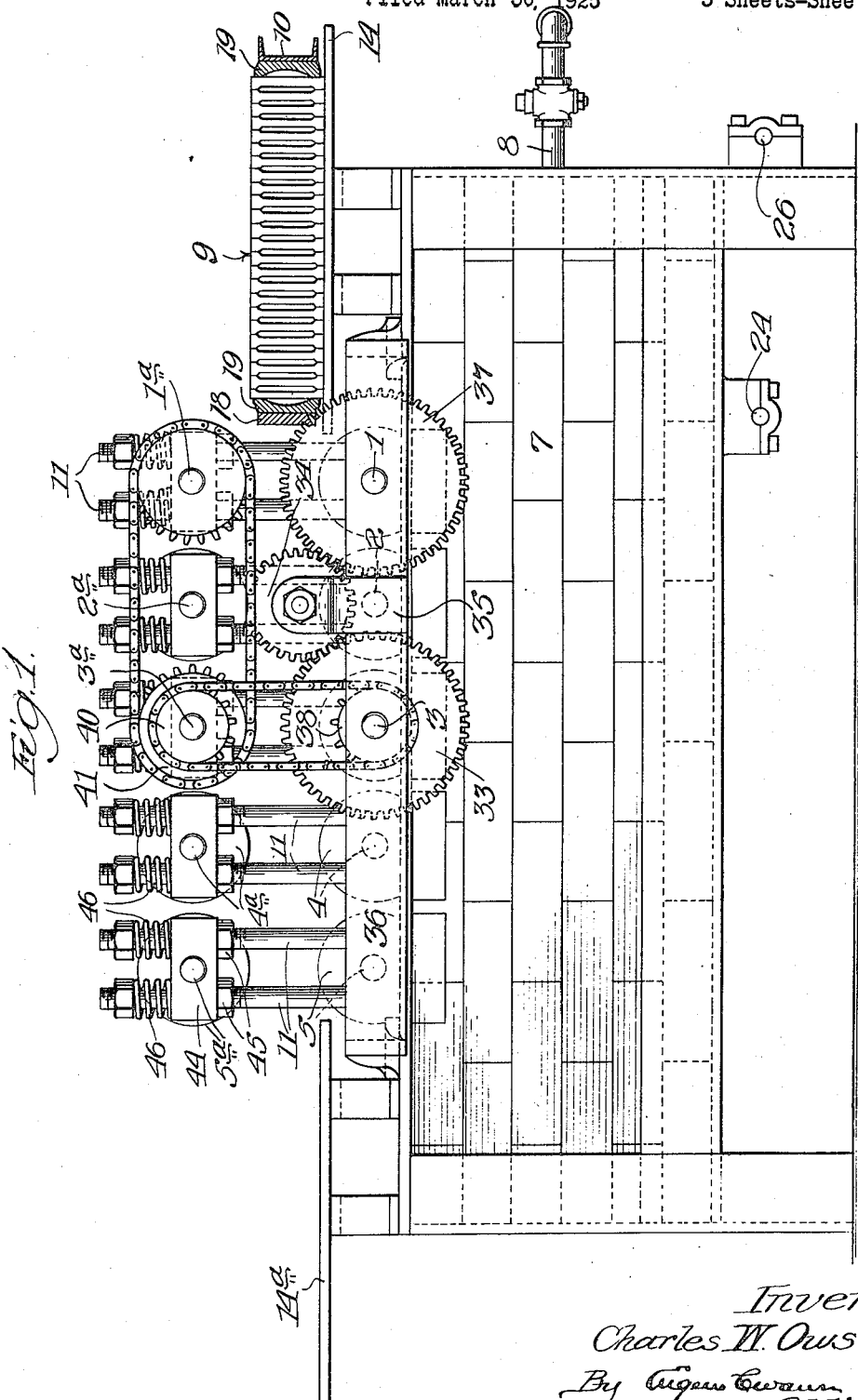
Inventor:  
Charles W. Owston,  
By Eugene Ewans  
Atty

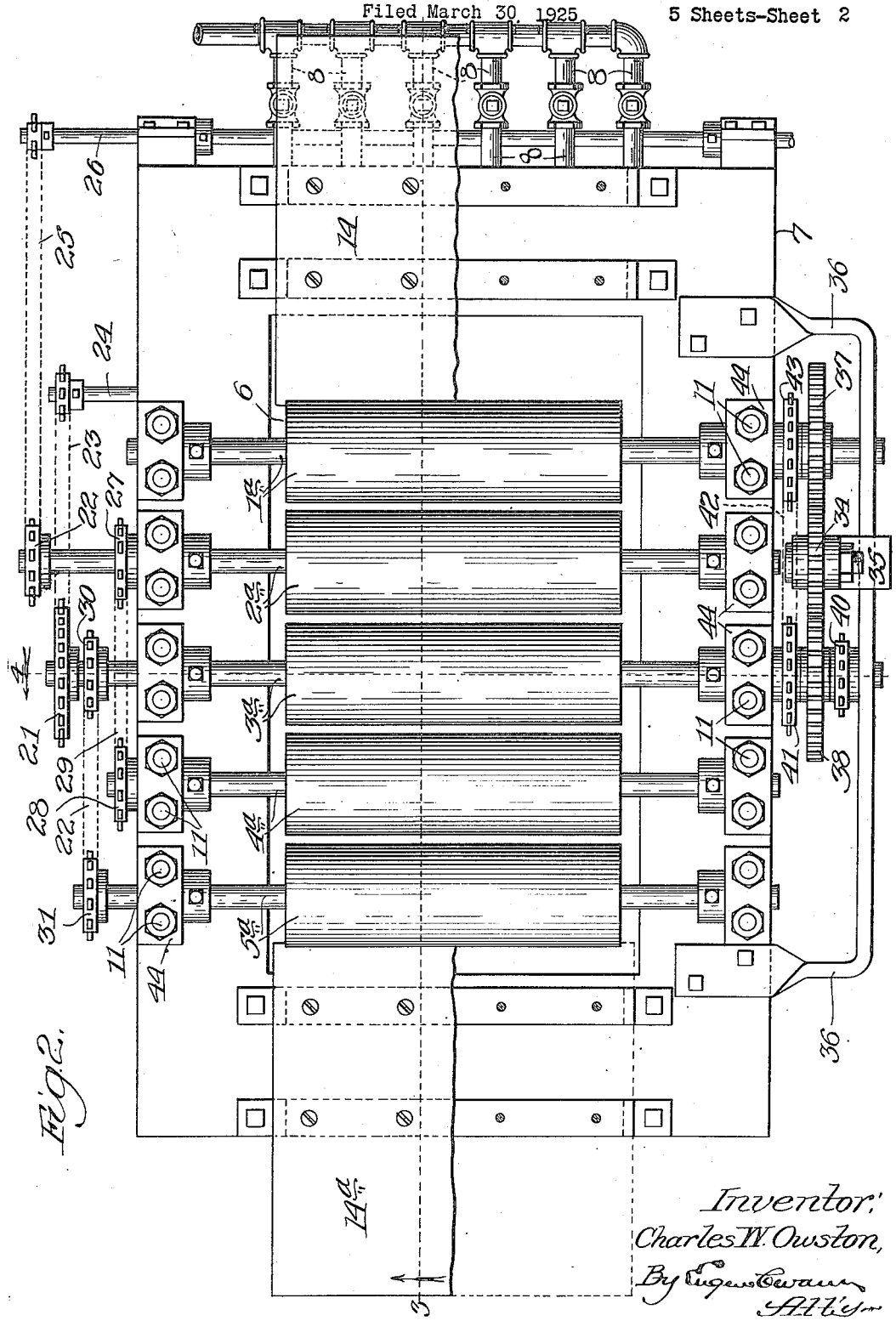

Feb. 28, 1928. 1,660,576
C. W. OWSTON
METHOD OF AND APPARATUS FOR SOLDERING
Filed March 30, 1925  5 Sheets-Sheet 3
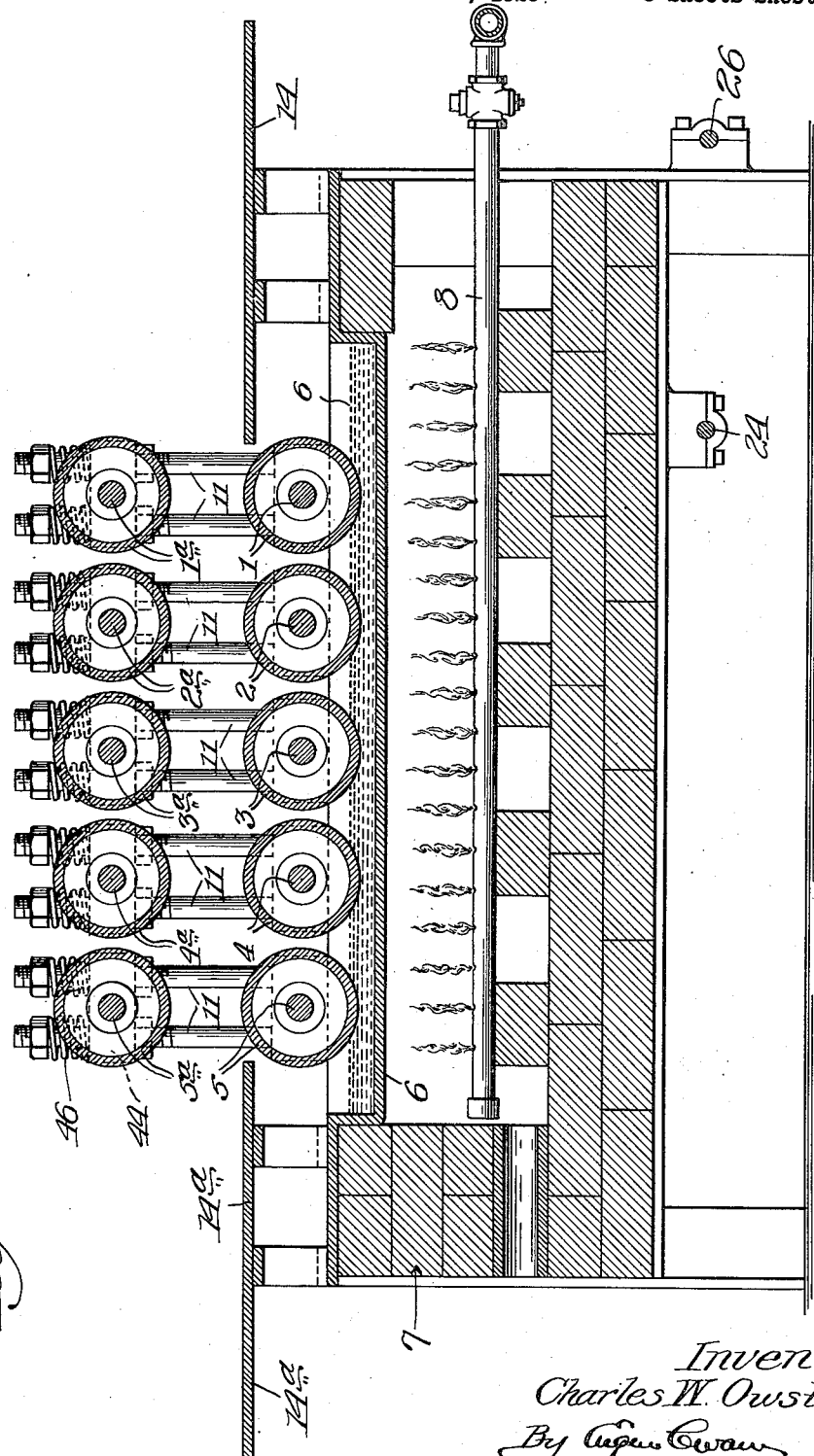
Inventor.
Charles W. Owston, Feb. 28, 1928.
C. W. OWSTON
1,660,576
METHOD OF AND APPARATUS FOR SOLDERING
Filed March 30, 1925      5 Sheets-Sheet 4
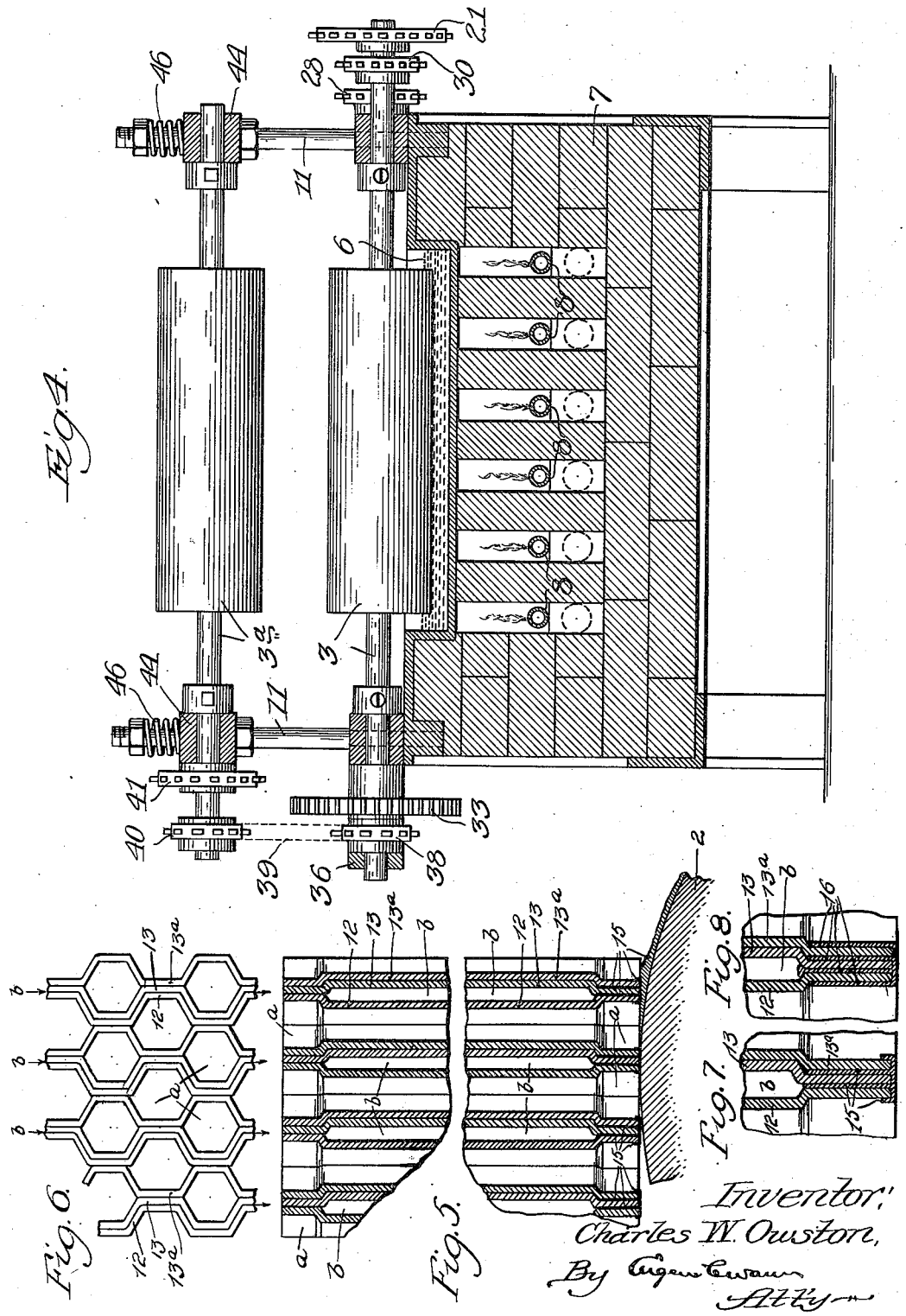

Feb. 28, 1928.  1,660,576
C. W. OWSTON
METHOD OF AND APPARATUS FOR SOLDERING
Filed March 30, 1925   5 Sheets-Sheet 5
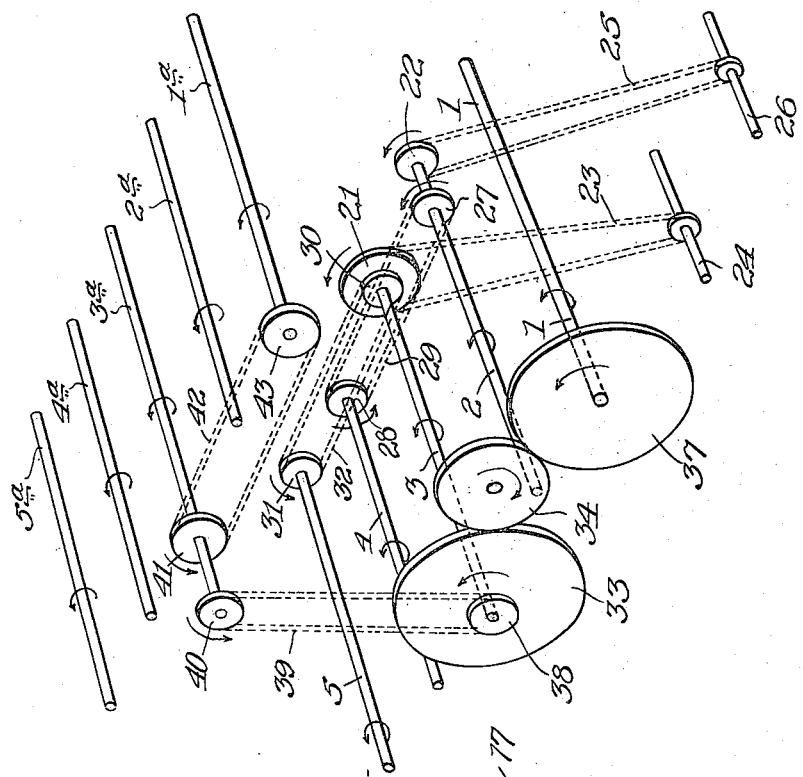
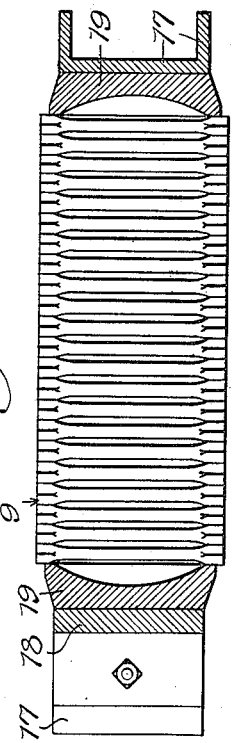
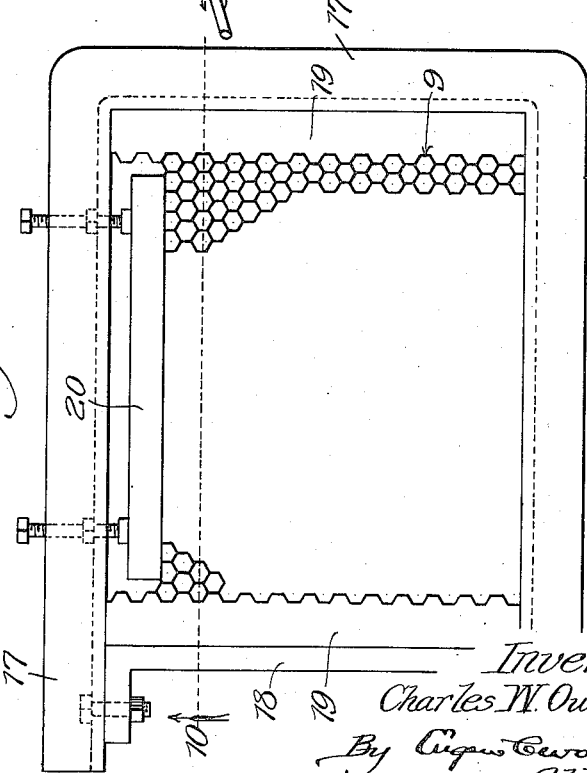
Inventor:
Charles W. Owston, Patented Feb. 28, 1928.

1,660,576

UNITED STATES PATENT OFFICE.

CHARLES W. OWSTON, OF DETROIT, MICHIGAN, ASSIGNOR TO McCORD RADIATOR & MFG. CO., OF DETROIT, MICHIGAN, A CORPORATION OF MAINE.

METHOD OF AND APPARATUS FOR SOLDERING.

Application filed March 30, 1925. Serial No. 19,309.

This invention relates to a method of and a machine or apparatus for applying molten solder in the joints along the edges of radiator cores.

Heretofore it has been the practice in soldering the radiator cores to dip the edges thereof into the solder bath with the result that the solder extended both inside and outside of the core to the extent of the dipping. Deep dipping caused the solder to enter the joints beyond the contact of the metal surfaces and also coated the outside of the core to a like extent. Coating the core with solder on the outside, as heretofore, is unnecessary and produces a waste of material, and also makes the core heavier than it should be. Moreover, deep dipping causes the solder to enter the water conduits beyond the joints, also producing a waste of solder by having an excess amount of solder in the conduits.

The object of my invention is to apply the molten solder to the joints along the edges of the core by means of rolls. This method will cause the solder to enter the joints to the extent of the contact of the metal, and thus avoid any excess solder inside of the core beyond the joints, as heretofore. Moreover, the solder does not run up very far on the outside of the metal and consequently there is no excess solder coating on the outside of the core.

With the old method of soldering, it takes from 4 to 4½ pounds of solder per core; while with my improved method, it will take from 1 to 1½ pounds of solder, which means a saving of 3 pounds of solder per core, with not in the least increasing the labor cost of soldering the core. This saving to a plant having a large production is considerable; not only does it save solder cost, but it also lightens the core.

The invention consists further in the matters hereinafter described and claimed.

In the accompanying drawings—

Fig. 1 is a side view of my improved machine;

Fig. 2 is a top plan view of the same;

Fig. 3 is a longitudinal vertical sectional view on line 3—3 of Fig. 2;

Fig. 4 is a transverse sectional view on line 4— of Fig. 2;

Fig. 5 is an enlarged vertical sectional view showing the core in contact with one of the solder applying rolls;

Fig. 6 is a top view of the parts shown in Fig. 5;

Fig. 7 shows a joint soldered by the method of my invention;

Fig. 8 shows a joint as soldered by the old dipping method;

Fig. 9 is a top plan view of an assembly frame and showing the core therein with parts broken away for the purpose of illustration;

Fig. 10 is a vertical sectional view on line 10— of Fig. 9; and

Fig. 11 is a diagrammatic perspective view illustrating the drive of the machine.

The machine shown in the drawings has an upper set of rolls 1 to 5 and a lower set of rolls 1ª to 5ª. These rolls are horizontally disposed with the rolls of the upper set spaced above the corresponding rolls of the lower set so that the core to be soldered may be passed between the two sets of rolls and in contact therewith. The rolls 1 to 5 of the lower set have their lower portions dipping into a bath of molten solder in a tank 6 to apply molten solder in the joints along the edges of the core in contact with said lower rolls in accordance with my invention. The tank 6 is supported in a suitable setting 7 of fire-brick, as shown in Fig. 3, and burner pipes 8, 8 are beneath the tank for heating the same, as shown.

The core is indicated by 9 and its holding frame by 10. The upper rolls 1ª to 5ª are supported on upright rods 11, 11 at the opposite ends of the rolls; said rods rising upward from the bed of the machine, as shown. The upper rolls are pressed downward by springs to hold the core when passed under them against the upper portions of the lower rolls, the springs allowing the upper rolls to yield to any irregularities in the thickness of the core.

The core is fed between the two sets of rolls by the feeding action of certain of the rolls on the edges of the core. Of the lower rolls, the first, third, and fifth are the feed rolls, while the second and fourth are the solder applying rolls. The rolls are all rotated in the same direction, but the solder applying rolls 2 and 4 are rotated at a rate of speed faster than the feed rolls. In the machine shown, the feed rolls 1, 3, and 5 are rotated at a speed of about 2 ft. per minute or 2¼ R. P. M., while the solder applying rolls 2 and 4 are rotated at a speed of about 90 ft. per minute, or 60 R. P. M. Of the upper rolls, two of them, preferably the ones 1ª and 3ª, are power driven in the same direction as the feed rolls of the lower set and at the same rate of speed. The drive of the rolls is illustrated in Fig. 11 and will be hereinafter described.

The core 9, as shown in Figs. 5 and 6, is made of a plurality of sections or units of sheet metal (brass) strips or plates 12, 13, 13ª corrugated and placed or assembled together to form alternating air and water passages $a$, $b$, respectively, as in automobile radiator design, and as shown in Fig. 5. The side edges or margins of these plates are offset to contact with the offset edges or margins of adjacent plates to form the water passages $b$, as in radiator design.

After being assembled and clamped in its frame 10, the core 9 is placed edgewise on the table 14 at the front end of the machine. From this table, the core is moved into the passageway between the two sets of rolls and carried therethrough by the feed of the feed rolls on the upper and lower edges of the core, the latter being delivered on the receiving table 14ª at the other or delivery end of the machine. The rate of travel of the core between the rolls is controlled by the speed of rotation of the feed rolls and, as the edges of the core pass over and in contact with the faster moving rolls 2 and 4, molten solder is applied to the edges of the core in contact with such rolls. After soldering one side of the core, the latter is turned over and again passed between the rolls to apply solder to the joints along the other side.

In passing the core edgewise between the rolls, the open outer ends of the joints at the lower rolls are in position to receive the solder directly from said rolls. The slower moving core at its contact with the faster moving rolls 2 and 4 hinders the free passage of molten solder picked up by said rolls, with the result that the solder picked up by said rolls backs up or accumulates in sort of a puddle or supply in advance of their contact with the core, as indicated in Fig. 5. The joints opening into this supply allows the molten solder to enter by capillary attraction between the overlapping metal surfaces and to be guided thereby up into the joints to the full extent of contact of the metal, as shown in Fig. 7.

It is preferable, although not essential, to pass the core between the rolls with the water conduits $b$, $b$ extending lengthwise of the core, as indicated in Fig. 6, wherein the directions of these conduits and the roll are indicated by the dotted lines $c$ and $d$, respectively. Molten solder is of course carried against the core edges by the feed rolls, 1, 3, and 5, but as these rolls rotate at a slow speed the solder gradually runs off back into the tank 6 without building up at the contact with the core as with the faster rolls 2 and 4.

As shown in Fig. 7, the solder coating, indicated by 15, extends up into the joint between the water conduit plates 12, 13 and the division plate 13ª. There is a coating of solder around the outer edges of these plates and for a short distance only up on the outside of the same. In Fig. 8, I have illustrated how the solder coating extends up along the outside of the core and into the joints when applying molten solder to the core edges by the old dipping method. It will be observed that the solder coating, indicated by 16 in Fig. 8, extends into the water conduit $b$ beyond the joint formed by the contacting portions of the radiator plates. The solder coating 16 also extends up on the outside of the plates to substantially their full extent of contact. Usually, in the dipping method, the core is dipped edgewise into molten solder to the depth of joints in order to fill the same. By capillary attraction the solder enters the water conduits beyond the joints and there accumulates as shown in Fig. 8. The solder also coats the outer surfaces of the plates to the extent of the dipping, as apparent. A shallower dipping would not coat the radiator on the outside to the extent as a deeper dipping, but this would not fill the joints as required.

By my improved method, there is a very small amount of solder on the outside of the core, yet the joints are filled to the proper extent. This results in a considerable saving in the amount of solder used over the old method of dipping and reduces the total weight of the core as compared with the old method, as heretofore stated.

It is essential that the plates 12, 13, and 13ª of the core be tightly clamped together by the frame 10 at their overlapping marginal portions so that no gapping joints be provided for the entrance of excess solder. In Fig. 10, I have shown a cross section through the frame and core, and it will be noted that the frame is cut away between the edges of the core so that all the clamping pressure of the frame on the core will be at the edges of the core and not on the relatively flexible mid-section thereof, as would be the case should the frame engage the core between the edges. Another essential feature of my invention is to avoid having the frame flush with the edges of the core to interfere with the application of molten solder thereto. This is accomplished by having the frame narrower than the thickness of the core so that the core projects slightly beyond the frame, as shown in Fig. 10.

The particular form of frame shown in

Figs. 9 and 10 comprises a substantially U-shaped member 17 made channel shape in cross-section and with the channel opening outward. This frame extends around three sides of the core, and in the open side of the frame there is a clamp bar 18. Filler strips or members 19, 19 are inserted between the frame and bar, respectively, as shown. These filler pieces, as shown in Fig. 9, are notched or corrugated along their edges which engage the core, so as to match or fit the corrugations of the core and thus permit the proper application of pressure thereto. These filler pieces are recessed back from their upper and lower edges to exert the clamping action around the side edges of the core and not along the middle portion thereof, as heretofore described. The frame has another bar 20 with clamp screws to engage the core along one side, as shown in Fig. 9.

The drive for the rolls is best illustrated in Fig. 11, wherein the shafts of the rolls have the same numbering as the rolls, the latter being omitted for the purpose of illustration. A sprocket wheel 21 (8" dia.) is placed on the shaft of the lower roll 3, and a sprocket 22 (6" dia.) is placed on the shaft of the lower roll 2. A sprocket chain 23 connects the sprocket 21 with a sprocket on one of the main driving shafts 24 below the rolls, while the chain 25 connects the sprocket 22 with the other driving shaft 26.

On the shafts of the lower rolls 2 and 4 are sprockets 27 and 28, smaller than the previous sprockets but of the same size and connected by a sprocket chain 29. On the shafts of the lower rolls 3 and 5 are sprockets 30, 31 of equal diameters and connected by a sprocket chain 32. These sprockets are larger in diameter than the sprockets 27 and 28 but smaller than the sprocket 21, as shown.

On the shaft of the lower roll 3 is a gear wheel 33 in mesh with an idler gear 34 on a standard 35 (Figs. 1 and 2) rising upward from a bracket bar 36 at the side of the machine and secured to the setting 7 at its ends, as shown in Fig. 2. Idler 34 meshes with a gear wheel 37 on the shaft of the lower roll 1. Gears 33 and 37 are of the same diameter. By the connections described, the feed rolls 1, 3, and 5 are rotated from the middle roll 3 from the driving shaft 24. The solder applying rolls 2 and 4 are rotated at a faster rate of speed from the driving shaft 26.

Of the upper rolls, the first and third, namely, 1ᵃ and 3ᵃ, are power driven. This is accomplished by providing the shaft of lower roll 3 with a sprocket 38 connected by a sprocket chain 39 with a sprocket 40 on the shaft of upper roll 3ᵃ. This shaft also has another sprocket 41 connected by a sprocket chain 42 with a sprocket 43 on the shaft of upper roll 1ᵃ. The remainder of the upper rolls are turned by frictional contact with the core as it is fed through the machine.

The distance between the top and bottom rolls is adjustable in order to adapt the machine to cores of different thicknesses. This adjustment is made possible by having the bearing boxes 44 (Figs. 1 to 4) of the upper rolls reamed to have a slip fit over rods 11 with adjusting nuts 45 on the threaded portions of the rods below the boxes, as shown. Coiled springs 46 are placed on top of the boxes so that the rolls may adjust themselves when there are any irregularities in the thickness of the core, and also to yieldably hold the core tightly against the lower rolls.

While the machine shown and described has the solder applying rolls 2 and 4 rotated in the same direction as the other rolls, I do not wish to be so limited, as these solder applying rolls may be rotated in the reverse direction and effectively apply molten solder to the joints at the edges of the core. The other parts of the machine may be variously changed and modified without departing from the spirit and scope of my invention.

I claim as my invention:

1. The method of applying molten solder in the joints along the edges of a cellular radiator core, consisting in moving the core between a plurality of upper and lower rolls by the feed of certain of the rolls on the opposite edges of the core with the lower rolls dipping into a bath of molten solder, and rotating at least one of the lower rolls relatively to the core for causing the solder carried by said roll to accumulate at the contact of the core with said roll and enter the joints of the core from the same, which joints have all portions of the overlapping metal making up the joints extending radially outward from said roll.

2. In a machine of the character described, the combination with a bath of molten solder, of a plurality of rolls arranged in upper and lower sets vertically spaced apart with the rolls of the lower set dipping into said bath, means for rotating certain of the upper and lower rolls for feeding a radiator core between them by contact with the opposite edges of the core along the joints therein, and means for rotating at least one of the lower rolls relatively to the other rolls for supplying molten solder to the joints of the core in contact with said lower roll.

3. In a machine of the character described, the combination with a bath of molten solder, of a plurality of upper and lower rolls spaced apart above the bath with the lower rolls dipping into the same, means for rotating certain of the upper and lower rolls for feeding the core between them, and means for rotating two of the lower rolls faster than the feed rolls and in the same direction for applying molten solder into the joints along the edges of the core in contact with said lower rolls.

4. In a machine of the character described, the combination with a bath of molten metal, of a plurality of upper and lower rolls spaced apart above the bath with the lower rolls dipping into the same, means for rotating certain of the upper and lower rolls for feeding the core between them, and means for rotating at least one of the lower rolls faster than the other rolls and in the same direction, said upper rolls being spring pressed for holding the core in contact with the lower rolls.

5. In a machine of the character described, the combination with a bath of molten solder, of a plurality of upper and lower rolls spaced apart above the bath with the lower rolls dipping in the same, certain of the upper and lower rolls being connected for rotation in unison and in the same direction for feeding a radiator core between the rolls, two of the lower rolls being connected for rotation in unison faster than and in the same direction as the feed rolls, and means for rotating the respective sets of rolls by applying power to one roll in each set.

6. In a machine of the character described, the combination with a bath of molten solder, of a plurality of upper and lower rolls spaced apart above the bath with the lower rolls dipping into the same, means for rotating certain of said rolls for feeding a radiator core between them and for applying molten solder into the joints along the edges of the core in contact with the lower rolls, and means on opposite sides of the rolls for supporting the core while being fed into and delivered from the rolls.

In testimony whereof I affix my signature this 18 day of March, 1925.

CHARLES W. OWSTON.